Patented Apr. 12, 1932

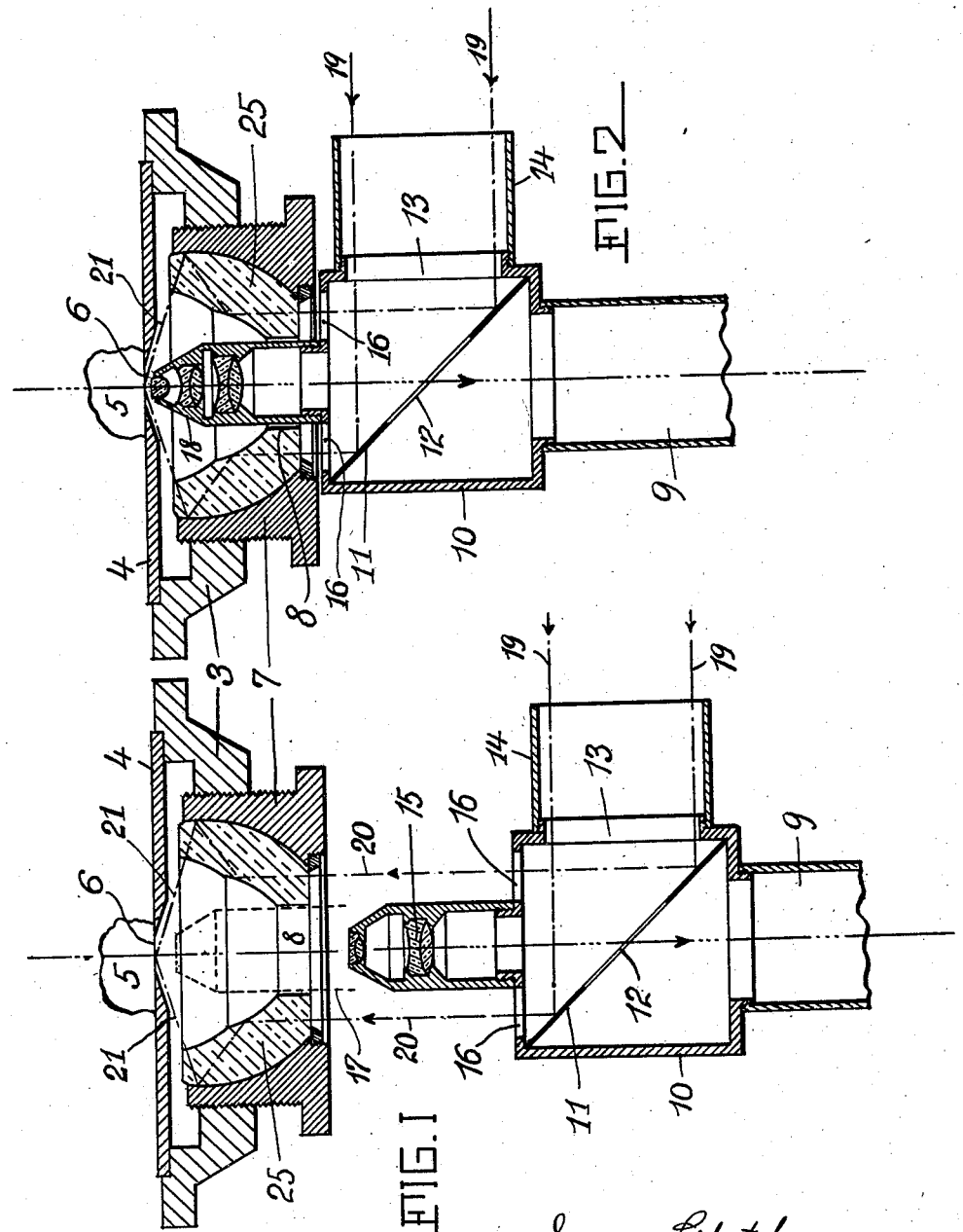

1,853,689

UNITED STATES PATENT OFFICE

ERWIN LIHOTZKY, OF WETZLAR, GERMANY, ASSIGNOR TO ERNST LEITZ, OPTISCHE WERKE, OF WETZLAR, GERMANY, A CORPORATION OF GERMANY

ILLUMINATING DEVICE FOR MICROSCOPES

Application filed September 24, 1930, Serial No. 484,024, and in Germany January 31, 1929.

The object of this invention is to provide improved illuminating means for microscopes of the Le Chatelier type, including means for separately mounting and operating the condenser and the objective, thereby making these two elements independent of each other for purposes of operation, adjustment and changeability. Another object of the invention is to eliminate a construction in which the objective and the condenser form a single operating unit. To this end the invention is embodied in a construction and arrangement as hereinafter described and as illustrated in the accompanying drawings in which Figure 1 is a central vertical sectional view through a Le Chatelier microscope, only so much thereof being shown as is necessary to understand the invention, the objective being shown in lowered position.

Figure 2 is a similar view showing the objective in normal operating raised position.

Referring to the drawings the reference numeral 3 denotes the stage of the microscope which supports a plate 4 on which the specimen 5 is placed over the opening 6 in the plate. 7 is a condenser frame threaded into the stage 3 for purposes of vertical adjustment therein. The frame contains a condenser 25 which may be of any suitable type, such as a dioptrical, catadioptrical or catoptrical condenser having one or more effective surfaces for reflecting illuminating rays directed against the underside of the specimen. The condenser is ring formed and provided with an aperture 8 through which the objective is raised or lowered during the operation.

The usual vertical microscope tube is indicated at 9 and carries a housing 10 containing an inclined reflector 11 having a central aperture 12. Through an opening 13 light from any suitable source not shown is admitted to the housing and the reflector, the illuminating rays being confined within a suitable tube 14 attached to the housing. The housing carries the centrally disposed objective 15 of any suitable construction. The upper wall of the housing is provided with apertures 16—16.

Figure 1 shows the objective in its lowered position. Its raised operating position is shown in dotted lines at 17. Figure 2 shows an objective 18 of a different construction from the objective 15. Otherwise the two figures are alike.

In operation the incoming light rays represented by the lines 19—19 are reflected by the reflector 11 upwardly through the openings 16 along the lines 20—20 which are parallel to the central axis of the microscope and thence into and through the condenser 25 in which the rays are condensed and reflected or directed toward the underside of the specimen as indicated by the lines 21—21.

The rays reflecting the picture of the specimen pass downward through the objective and the opening 12 in the reflector for observation in the usual manner.

It will be seen that in the operation of the device the objective may be adjusted with respect to the specimen independent of the position of the condenser and vice versa. Also that either or both of the condenser and the objective may be changed without the one effecting the other.

I claim:

1. Illuminating means for microscopes comprising a stage having a central aperture for observing a specimen placed on the stage, a ring formed condenser mounted below the stage in vertical adjustable relation thereto, an objective mounted below said condenser and adapted to be moved upwards into operative relation within said ringformed condenser and means movable with the objective for directing illuminating rays upwards around the objective and to the said condenser, said light directing means being apertured to permit a downward illuminated reflection of the specimen.

2. Illuminating means for microscopes comprising a stage for supporting the specimen, a condenser and an objective mounted in co-axial relation below the stage, means in the objective for directing a hollow circular bundle of rays against the condenser and specimen and mechanism for moving the objective and the said ray directing means with relation to the stage and specimen thereon.

3. Illuminating means for microscopes comprising a stage for supporting a specimen to be examined from below, a ring formed light reflecting condenser mounted below said stage, a microscope objective mounted in co-axial relation with said condenser, a reflector carried by said objective for directing illuminating rays upwards around the objective towards the condenser, said reflector having an aperture permitting the downward passage of rays for reflecting the picture of specimen and means for simultaneously moving the objective and the reflector into operative relation with said condenser and away therefrom.

Signed at Frankfort-on-Main, Germany, this 8th day of September, A. D. 1930.

ERWIN LIHOTZKY.